UNITED STATES PATENT OFFICE.

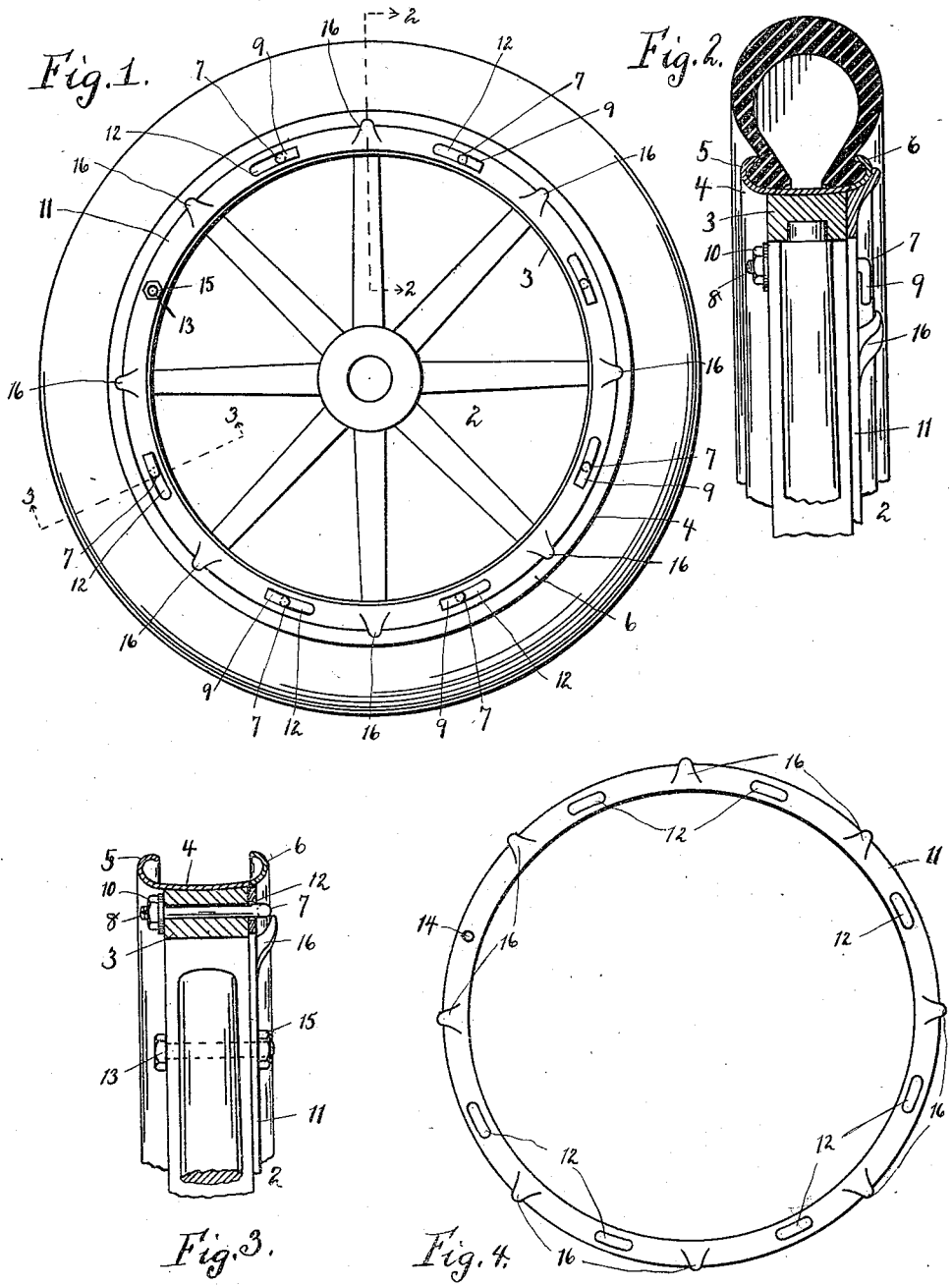

JAMES D. WILLIAMSON, OF PHOENIXVILLE, PENNSYLVANIA.

WHEEL-RIM.

1,279,199.  Specification of Letters Patent.  Patented Sept. 17, 1918.

Application filed May 12, 1916. Serial No. 97,048.

*To all whom it may concern:*

Be it known that I, JAMES D. WILLIAMSON, a citizen of the United States, residing at Phoenixville, in the county of Chester and State of Pennsylvania, have invented new and useful Improvements in Wheel-Rims, of which the following is a specification.

My invention relates to new and useful improvements in wheel rims, and has for its object to provide an exceedingly simple and effective device of this character whereby the two parts of a wheel rim may be detachably fastened together for holding a tire upon the wheel.

A further object of the invention is to provide means for readily and quickly fastening one part or member of a wheel rim in position so as to coact with the other or stationary part of the rim, whereby a tire may be quickly and securely mounted upon a wheel.

Another object of the invention is to provide a two part wheel rim, said two parts being manufactured separately or produced by bipartitioning a rim originally manufactured in one piece and to provide means for detachably securing the demountable part in contact with the stationary or permanent part, said means being so constructed that it may be readily and quickly removed or replaced.

A still further object of the invention is to provide a wheel having a felly and rim, the latter being annularly bifurcated, a ring having lugs for engaging the demountable part of the rim, attaching means carried by the felly for engaging slots in the ring, and a fastening or holding means for holding or locking the ring in place.

With these ends in view, my invention consists in the details of construction and combination of elements hereinafter set forth and then specifically designated by the claim.

In order that those skilled in the art to which this invention appertains may understand how to make and use the same, I will describe its construction in detail, referring by numerals to the accompanying drawing forming a part of this specification, in which—

Figure 1, is a side elevation of a wheel embodying my improvement.

Fig. 2, is an enlarged fragmentary section on the line 2—2 of Fig. 1.

Fig. 3, is a similar view on the line 3—3 of Fig. 1, the tire being removed; and Fig. 4, is a side elevation of the ring as shown in Fig. 1, removed from the wheel.

In carrying out my invention as here embodied 2 represents a wheel having a felly 3 and a rim 4, the latter being similar to those used upon automobiles for holding a tire thereon and more particularly a tire of the clencher style. The rim 4 consists of two parts, the permanent or stationary member 5 and the demountable flange or member 6, thus making an annular bifurcated rim. The permanent or stationary member 5 is attached to the felly 3 and the demountable member 6, may be produced separately from the permanent member when the rims are originally manufactured, or said demountable part 6 may be formed by cutting the same from a rim as at present manufactured. By cutting the demountable part 6 from the rim, my device may be constructed from wheels already in use, so that a person desiring a device of this character may obtain the same without having to purchase an entirely new wheel.

The felly 3 has mounted thereon a number of attaching devices 7 in the form of L shaped screws or bolts, the body 8 of each of these attaching devices passing through the felly with the extension or foot 9 situated at one side of the felly and spaced therefrom. The fastening devices are held in place by nuts 10 or their equivalent. When the demountable part 6 of the rim is in position the ring 11 is placed upon the wheel by bringing the slots 12 into registration with the projecting extensions 9 of the fastening devices.

After the ring has been placed upon the wheel the same is rotated until the solid portions of the ring pass beneath the extension 9 of said fastening devices, where it will be held or locked by a suitable holding means. The holding means consists of a bolt 13 passing through the felly 3 and through a bolt receiving hole 14 in the ring, said bolt being held in position by a nut 15 or its equivalent. The slots 12 in the ring are preferably arcuate in shape and spaced to correspond with the fastening devices 7, and where a locking or holding bolt 13 is used the hole 14 in the ring will aline with said bolt after the ring 11 has been rotated to move the slots 12 out of alinement with the extensions 9 of the fastening devices.

The ring 11 has a number of lugs, projections or bosses 16 formed integral therewith and projecting outwardly from the face of the ring, and beyond the periphery thereof, so that said projections, lugs or bosses will engage the demountable part 6 of the rim at a number of spaced points.

In order to place a tire upon a wheel constructed in this manner it is only necessary to disengage a single locking or holding means, after which the ring may be rotated to cause the slots 12 therein to register with the extensions 9 of the fastening devices. When said slots are in registration with the extensions of the fastening devices, the ring may be taken off and the demountable part 6 of the rim removed.

As the inner circumference of a tire accordingly fits the outer circumference of the internal part of the rim, the tire may be readily placed upon the stationary or permanent part 5 of the rim, after which the demountable part 6 is placed in position and the ring 11 placed upon the wheel with the slots 12 in registration with the extensions 9 of the fastening devices.

By rotating the ring, said slots 12 are moved out of registration with the extensions 9 and the ring 11 will be frictionally held in position until locked. Where an automatic locking device is used, the rotation of the ring will cause the same to be locked to the felly, but where a locking or holding bolt is used, said bolt here represented by the numeral 13 is passed through the felly and into the hole 14 in the ring with its end projecting beyond the face of the ring. A nut 15 may then be threaded on the bolt to hold the same in position, or some other equivalent means may be used, as for instance a cotter pin.

When the ring 11 is placed upon the wheel, the lugs 16 formed therewith are brought into engagement with the demountable part, so as to hold the same securely in position in contact with the stationary or permanent part 5.

From this description it will be seen that I have provided an exceedingly simple and effective construction of wheel, whereby the rim may be divided into two parts so that one part will be demountable to permit ready and easy mounting and demounting of the tire.

Of course I do not wish to be limited to the exact details of construction as here shown, as these may be varied within the limits of the appended claim without departing from the spirit of my invention.

Having thus fully described my invention, what I claim as new and useful, is—

In combination with a wheel, a two-piece rim, one piece of which is detachable and when coacting with the other piece forms a joint at one side of the wheel, a ring detachably secured to the wheel and adapted to underlie the joint between the two rim pieces whereby the permanent piece will hold the detachable ring in position against any diametrical stress caused by the detachable piece and lugs formed integral with the ring piece and adapted to engage the rim piece to prevent the accidental removal thereof.

In testimony whereof, I have hereunto affixed my signature in the presence of two subscribing witnesses.

JAMES D. WILLIAMSON.

Witnesses:
W. E. BUSHONG,
WINIFRED M. MURPHY.

Copies of this patent may be obtained for five cents each, by addressing the "Commissioner of Patents, Washington, D. C."